United States Patent [19]

Boyadjieff

[11] 4,051,587
[45] Oct. 4, 1977

[54] PILE HANDLING APPARATUS AND METHODS

[75] Inventor: George I. Boyadjieff, Anaheim, Calif.

[73] Assignee: Varco International, Inc., Orange, Calif.

[21] Appl. No.: 710,450

[22] Filed: Aug. 2, 1976

[51] Int. Cl.² .................................................. B23P 19/04
[52] U.S. Cl. ......................................... 29/240; 61/53.5; 61/63
[58] Field of Search .................. 29/240; 61/63, 53.5

[56] References Cited
U.S. PATENT DOCUMENTS

| 2,927,435 | 3/1960 | Upson | 61/53.5 |
| 3,629,927 | 12/1971 | Palmer | 29/240 |
| 3,950,954 | 4/1976 | Haug | 61/63 |

Primary Examiner—James L. Jones, Jr.
Attorney, Agent, or Firm—William P. Green

[57] ABSTRACT

A pile handling tool is supported at the upper end of a tubular guide, and includes a jacking mechanism for advancing a pile longitudinally relative to the guide, and a mast projecting upwardly above the jacking mechanism and carrying an aligning structure for laterally engaging a pile and holding it in properly aligned position with respect to the guide. The mast is desirably mounted for retracting movement from an upwardly projecting active position to a laterally retracted inactive position. The jacking mechanism may be constructed to rotate one of two successive pile sections relative to the other to complete a connection therebetween.

20 Claims, 14 Drawing Figures

PILE HANDLING APPARATUS AND METHODS

BACKGROUND OF THE INVENTION

This invention relates to improved apparatus and methods for handling piles as they are moved into position for supporting a work platform or other structure, such as for example an off-shore drilling rig.

In erecting an off-shore drilling platform, it is customary to first move the desired drilling location in a framework or 'jacket' which includes a number of generally vertical tubular pile guides to and to then advance downwardly through each of the guides a series of pile sections, which are connected together longitudinally and are of a composite length to reach and ultimately be driven into the floor of the ocean or other body of water, so that the platform and drilling equipment may then be supported at an elevated location by the jacket.

As a pile section is moved into engagement with and then advanced through a guide of the discussed type, it is often very difficult to manipulate the usually very large and heavy pile section in a manner controlling effectively its movement and orientation, and maintaining its proper alignment with the guide and with another section previously positioned in the guide as a connection is made between the two sections. These and other pile handling problems are in many instances rendered more troublesome by wave induced movement of some or all of the pile manipulating equipment.

SUMMARY OF THE INVENTION

The present invention provides apparatus and methods which greatly facilitate the handling of a series of pile sections as they are connected together and progressively advanced downwardly through the locating guide of a jacket structure. The invention enables two successive sections to be held very effectively and positively in accurately aligned relation as one section is moved downwardly into engagement with and connected to a next lower section, and then as the two sections are advanced downwardly together in preparation for connection to a third section.

A tool embodying the invention includes a support structure which is adapted to be located and supported at the upper end of a pile guide, and which carries a jacking mechanism through which a pile can extend downwardly into the guide. This jacking mechanism is power operable to progressively advance one or more sections of the pile downwardly relative to the guide, and desirably includes two gripping units, one of which is movable vertically relative to the other to effect a jacking operation. The two gripping units may include slips which are wedged against the outer surface of a pile section to releasably grip it. Powered means may be provided for turning one of the gripping units relative to the other in order to relatively rotate two successive pile sections to complete a joint therebetween.

In addition to the jacking mechanism, the support structure also preferably carries an aligning mast, which projects upwardly beyond the jacking mechanism and carries aligning means engageable with a pile section to laterally support it in a properly aligned and precisely controllable orientation with respect to the jacking mechanism and the pile guide. A stabbing unit may be carried by the support structure, and contain and form a downwardly tapering guide throat which is engageable with the lower end of a pile section to center it as it moves downwardly into the jacking mechanism and guide.

The aligning mast is desirably mounted to the support structure for retracting movement between an active position in which it is properly located for aligning engagement with a pile section, and a laterally retracted inactive position. This movement may be a swinging type movement, in which the upwardly projecting mast swings laterally outwardly and downwardly about a hinge axis at essentially the lower end of th mast. The mast may be held in this retracted position during movement of an add-on pile section into initial locating engagement with the tapering throat of the stabbing unit, and/or during ultimate powered driving of the pile into the ocean floor.

BRIEF DESCRIPTION OF THE DRAWINGS

The above and other features and objects of the invention will be better understood from the following detailed description of the typical embodiment illustrated in the accompanying drawings in which.

DESCRIPTION OF THE PREFERRED EMBODIMENT

Figure 1:
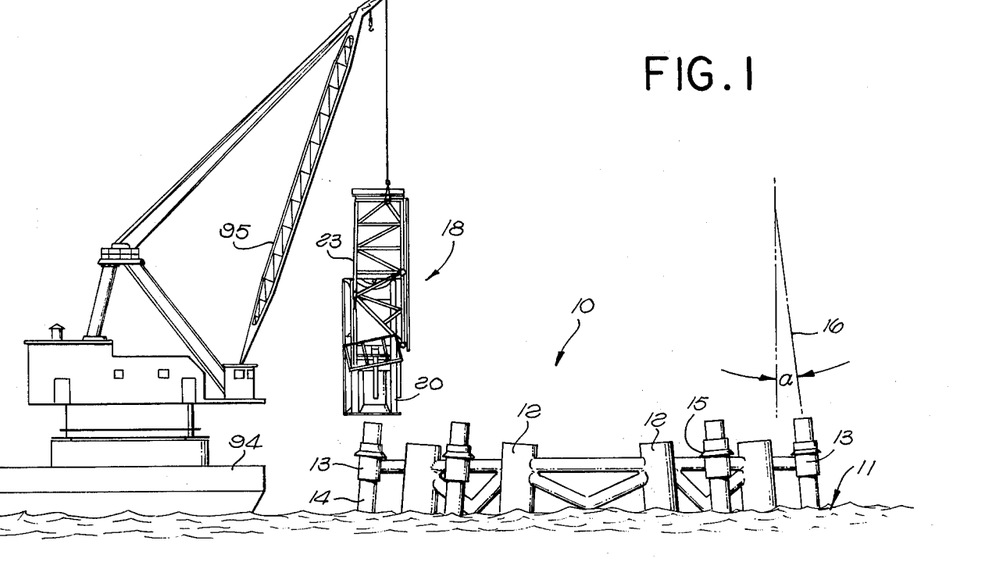
FIGS. 1 to 6 show diagrammatically several successive steps which may be performed in utilizing equipment embodying the invention, with the cat-walk omitted from some of the views for simplicity and clarity.

Referring first to FIG. 1, there is illustrated at 10 a 'jacket' which has been positioned at an off-shore location in a body of water 11, and which consists of a framework typically having a number of spaced legs 12 projecting downwardly to positions of support on the floor of the body of water. The jacket also includes a number of tubular pile guides 13 through which elongated piles are to be advanced downwardly to ultimately be driven into the floor of the body of water for supporting a work platform at the upper ends of the piles above the water level. Each of the piles is normally formed of a number of pile sections which are connected together in end-to-end relation, with an initial one of these sections, as represented at 14 in FIGS. 1 and 2, preferably being premounted and temporarily tack welded in each guide at the time of manufacture of the jacket and before its movement to the drilling location. The joints between successive pile sections are in some instances formed by welding, and in other cases by interfitting mechanical connectors on the sections which may be jointly rigidly together by predetermined relative rotary movement of the two sections, as for instance in a joint of the commonly used 'breech block' type in which interrupted threads are brought into connection relation by limited relative rotary movement of the sections.

The pile sections are usually externally cylindrical, and may be formed as metal pipes. Each of the pile guides 13 preferably is of straight cylindrical configuration externally and internally about an axis 16 of the guide, and carries an annular tool support 15 extending about guide 13 at a location spaced beneath its upper edge and welded or otherwise rigidly secured to the guide, with the support having an annular upwardly tapering frustoconical upper tool support surface 17 centered about axis 16. The internal diameter of the guide is just slightly greater than the external diameter of the pile sections, to effectively locate the pile section relative to the guide. The guides 13 desirably have their axes 16 inclined at a small 'batter' angle $a$ with respect to the true vertical, to direct the piles downwardly at a corresponding angle into the ocean floor.

Figure 2:
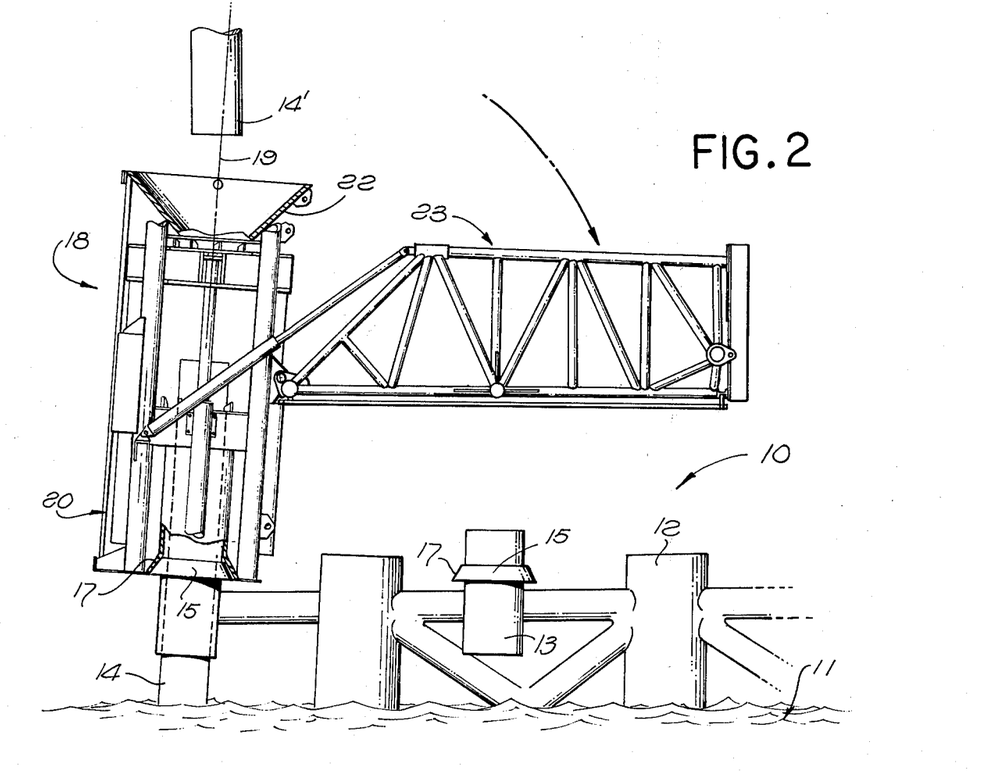
Figures 3, 4:
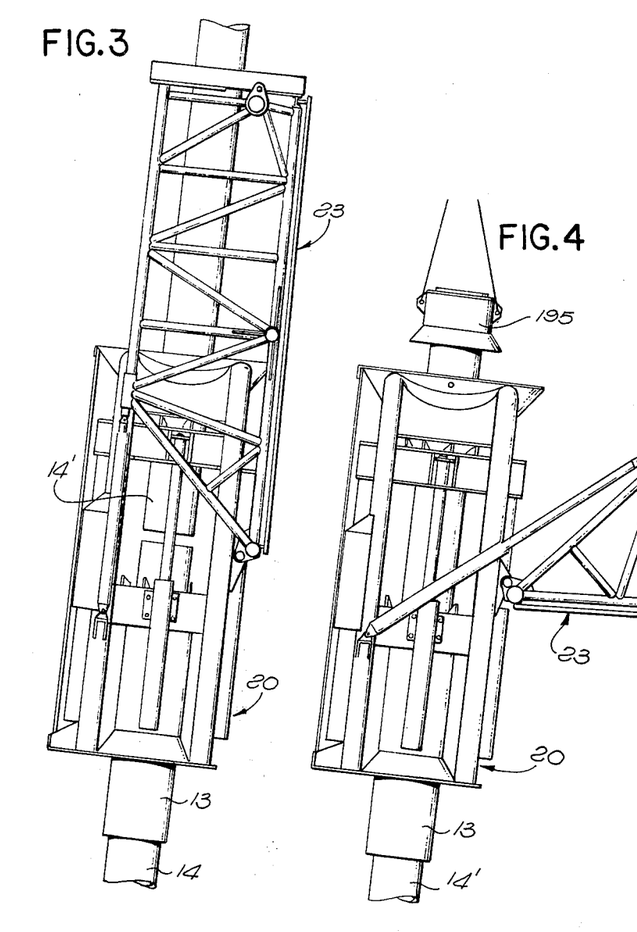

A pile handling tool constructed in accordance with the present invention is illustrated generally at 18 in FIG. 1 and the other figures, and is adapted to be supported successively on the upper ends of the various pile guides 13, in a position such as that illustrated in FIGS. 2 and 3, for use in lowering the pile sections downwardly through the guides and to the ocean floor. If the axis of a particular guide is inclined, as discussed, the longitudinal axis 19 of tool 18 is similarly inclined and aligned with the guide axis 16 when the tool is supported on that guide. However, to simplify the illustration and description of the details of the tool 18, it has been illustrated in FIGS. 7 through 13 in a directly vertically extending position, with the axis 19 extending precisely vertically.

Figure 7:
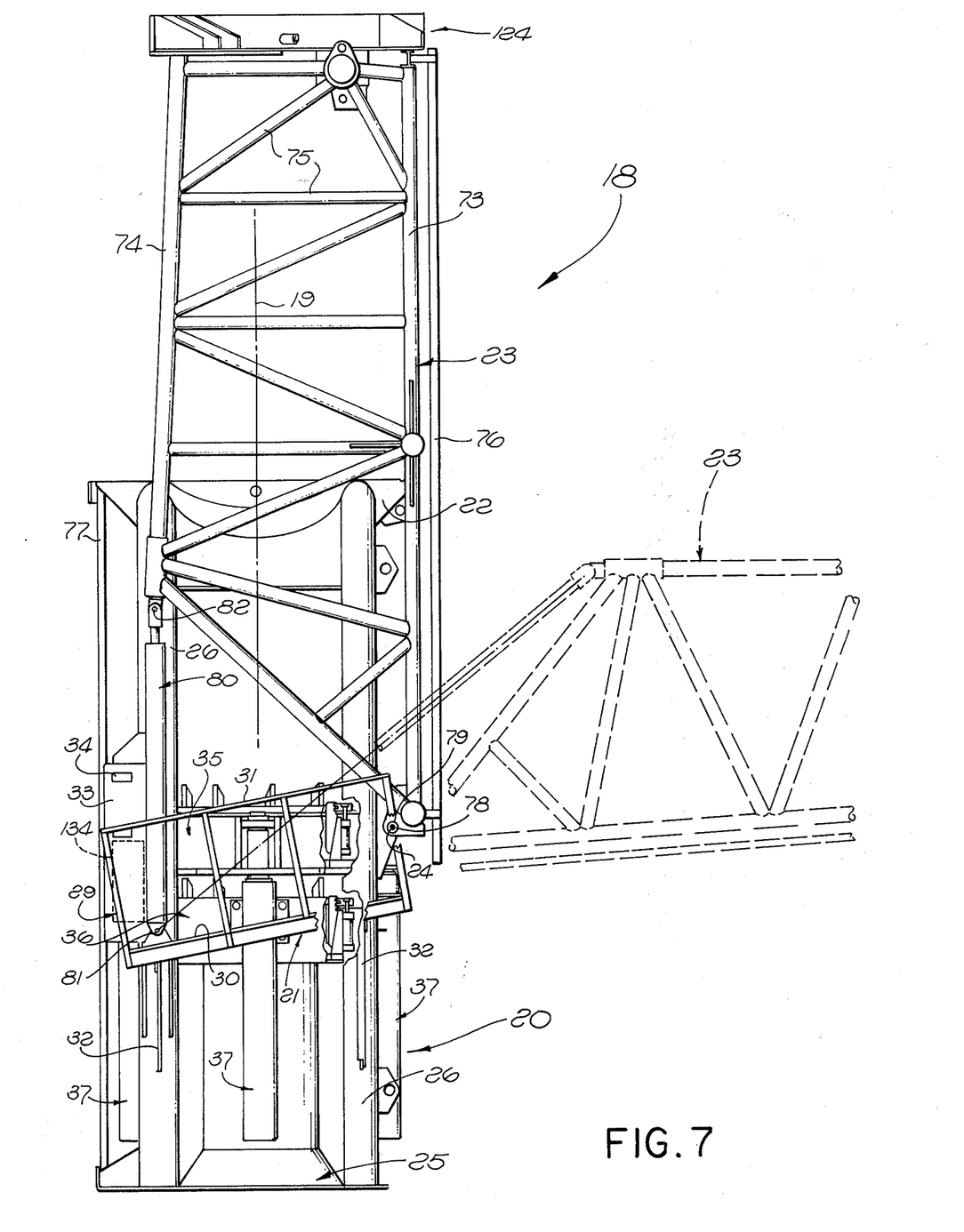
FIG. 7 is a greatly enlarged side view of a machine embodying the invention, shown for simplicity of illustration and description in a directly vertical position, rather than the slightly inclined position of FIG. 3 in which the device is normally utilized.
Figure 8:
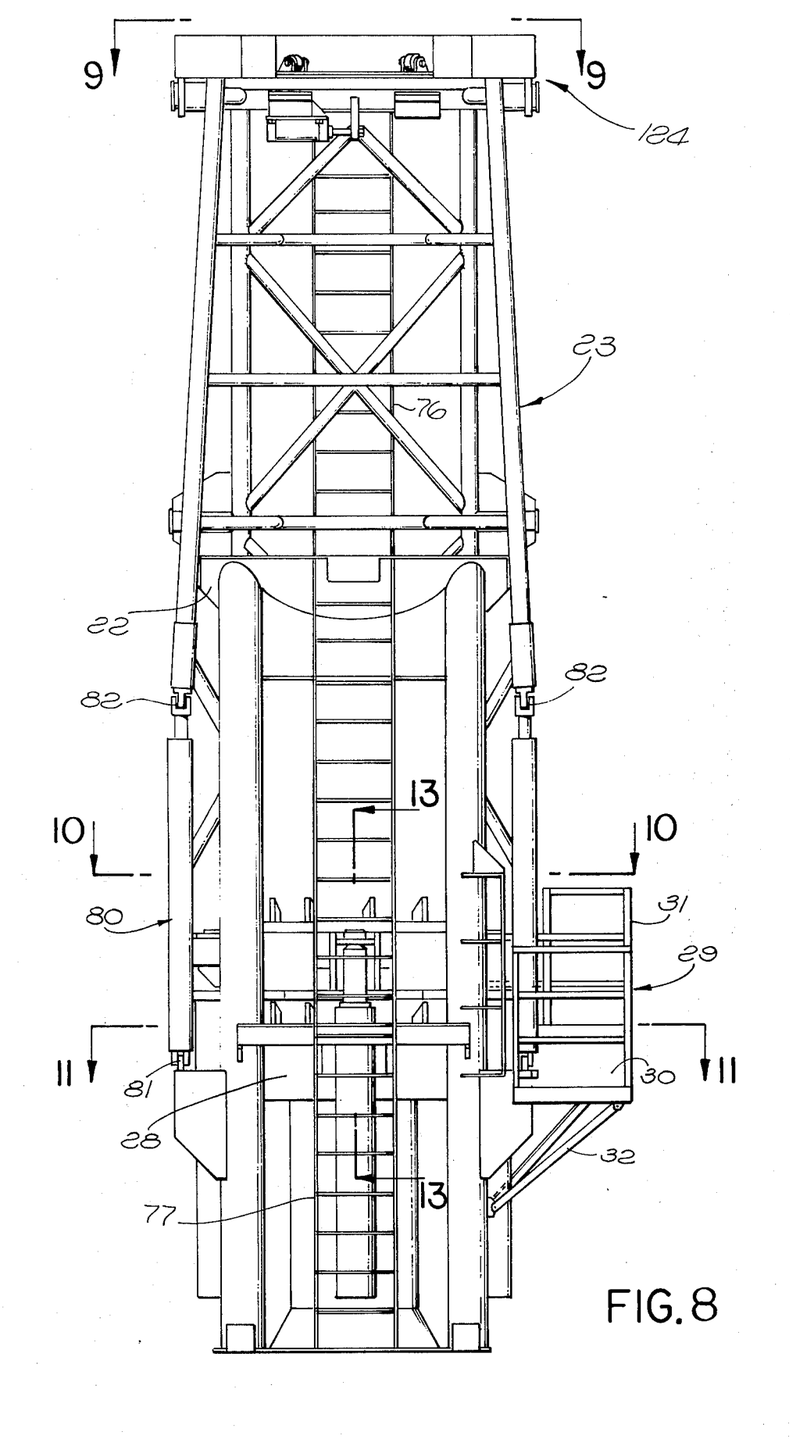
FIG. 8 is an elevational view taken on line 8—8 of FIG. 7.

With reference now to FIGS. 7 and 8, the tool 18 includes a lower main frame or support structure 20 which is formed of a number of appropriately shaped parts welded or otherwise secured rigidly together, and which frame is adapted to rest on the upper tapering support surface 17 of part 15 and be supported stationarily thereby. The frame 20 carries a jacking mechanism 21 at a location above the pile guide, and at its upper end carries a stabbing bell 22 for receiving and centering a lower end of a pile section. An aligning mast 23 projects upwardly from frame 20, and is connected thereto for swinging movement about a horizontal axis 24 between the positions of FIGS. 2 and 3. An aligning unit 124 for laterally engaging the pile is carried at the upper end of mast 23. The main frame 20 has an annular flaring base element 25, with an undersurface adapted to engage and be supported by, and flaring frustoconically and downwardly in correspondence with, the upper surface 17 of part 15. Welded to and projecting upwardly from base element 25, the frame 20 may also include four tubular circularly spaced legs or corner posts 26 whose upper ends are rigidly welded to and carry the stabbing bell 22. The structure 20 may be reinforced at a location beneath the jacking mechanism 21 by plates 28 extending between and welded to corner posts 26, but with these plates and all other portions of the frame structure being offset far enough from axis 19 of the tool to leave a clear passage entirely through the tool for extension of a pile therethrough.

At one of its sides, frame 20 carries a work platform 29, having a floor 30 on which a workman stands and which extends at an angle with respect to axis 19, so that in the inclined FIG. 3 position of use the tool floor 30 is horizontal. The work platform may include rails 31 extending about three sides of the platform, with the platform being appropriately secured rigidly to the rest of the frame structure by means typically including angular braces 32 at the underside of the platform. A control panel 33 is secured to one of the legs 26 of the frame and carries a number of hydraulic control valves 34 positioned for manual actuation by a workman standing on floor 30 to control the delivery of pressurized hydraulic fluid from a power source 134 to the various hydraulic actuating mechanisms later to be described.

The jacking mechanism 21 includes two vertically spaced upper and lower gripping units 35 and 36, the lower of which is positioned at a fixed level on the frame 20, while the upper gripping unit 35 is actuable upwardly and downwardly parallel to axis 19 relative to frame 20 and lower gripping unit 36, between the full line and broken line positions of FIG. 7, preferably by four hydraulic piston and cylinder mechanisms 37.

The upper gripping unit 35 of the jacking mechanism (see FIGS. 10, 12 and 13) includes a rigid horizontal base plate 38 having arcuately curving recesses 39 in its periphery for partially receiving the four corner posts 26 of frame 20. A number of arcuate guide bushings 139 are carried in at least some of the recesses 39 for slidably engaging the corresponding corner posts in a relation locating and guiding plate 38 for upward and downward movement relative to the frame. The upper ends of the piston rods 39 of a piston and cylinder mechanisms 37 are connected rigidly to base plate 38 to cause upward and downward movement of the base plate in correspondence with the delivery of pressurized hydraulic fluid to opposite ends of the cylinders 41 of mechanisms 37. The axes 42 of the four circularly spaced piston and cylinder mechanisms 37 are parallel to and spaced circularly about axis 19 of the tool, in symmetrical relation with respect thereto. The cylinders 41 are secured rigidly to frame 20 in any appropriate manner as for instance by bolts 43 securing flanges on the cylinders to walls 28 of the frame.

At its upper side, the rigid horizontal base plate 38 of gripping unit 35 rigidly carries an annular upwardly projecting ring 44 (FIGS. 10 and 13), to which outwardly projecting horizontal walls 45 are welded for providing the mentioned connections 40 between the upper ends of the piston rods 39 and the base plate. More particularly, each of these walls 45 may contain an opening 140 through which an upper reduced diameter portion of the piston rod projects for threaded connection to a retaining nut 40, with the piston rod having a larger diameter beneath wall 45 and at a location of extension through an opening 46' in the peripheral portion of base plate 38.

At the upper side of base plate 38 and within annular ring 44, there is movably mounted an annular slip bowl assembly 46 including a horizontal bottom ring 47 and an upstanding ring 48 having an inner downwardly tapering frustoconical wedge surface 49 centered about axis 19. A series of circularly spaced slips 50, having gripping elements 51 at their radially inner sides of a type capable of transmitting both vertical and rotary forces to or from an engaged pile, have downwardly and inwardly inclined outer wedge surfaces 52 engageable with surface 49 to cam the slips radially inwardly in response to downward movement relative to the slip bowl assembly. The slips are guided for such movement and in all positions retained against surface 49 by guide elements 53 (FIGS. 10a and 13) which are secured rigidly to upper portions of surface 49 by screws or the like and have lateral flanges 54 spaced from and parallel to surface 49 to define therewith guideways receiving opposite side flanges 55 of the individual slips and retain them for controlled sliding movement.

The slips are actuable upwardly and downwardly by an annular ring 56 (FIG. 13), which has portions 57 projecting into recesses in the sides of the slips, with pins 58 carried by the slips being received within horizontal slots 59 in portions 57 to allow radially inward and outward movement of the slips as they are actuated upwardly and downwardly. Ring 56 is moved upwardly and downwardly by a series of similar circularly spaced vertical piston and cylinder mechanisms 60, whose cylinders may be secured rigidly to the outer side of ring 48 of the slip bowl structure, and whose pistons may have their upper ends rigidly connected by nuts 61 to ring 56. As will be apparent, the axes 62 of these piston and cylinder mechanisms extend vertically and parallel to maintain axis 19 of the machine. Bottom ring 47 of the slip bowl structure is securely rigidly to upstanding ring 48 by bolts or otherwise, and has an undersurface 63 engageable in bearing relation with the upper surface of base plate 38 to allow rotary movement of the slip bowl structure and slips about axis 19, with this structure being centered by ring 44 secured to base plate 38. The slips and associated parts are turned about axis 19 by two horizontal piston and cylinder mechanisms 64 (FIG. 10), whose cylinders are pivoted at 65 to brackets 66 appropriately secured to ring 44, with openings in that ring being provided at 67 to pass the piston and cylinder mechanisms therethrough. The piston rods of mechanisms 64 are pivotally connected at 68 to hinge elements 69 welded to the outer side of slip bowl ring 48.

A number of circularly spaced vertically elongated members 70 may be welded to the inner downwardly tapering surface 49 of slip bowl ring 48 at locations between different groups of the slips 50, with upper portions of member 70 being received within recesses 71 in slip actuating ring 56. The radially inner surfaces 72 of members 70 may extend directly axially, that is, parallel to axis 19, and be spaced a common distance therefrom, which distance is greater than the radial distance of the clamping elements 51 of the slips from axis 19 in the lower pile gripping positions of the slips, but less than the distance of elements 51 from axis 19 in the upper retracted positions of the slips. Consequently, in the retracted positions of the slips, members 70 can engage and guide and locate a pile section and prevent unnecesssary wearing contact with the slips.

The lower gripping assembly may be basically the same as upper assembly 35, except that the slip bowl assembly 46a, including the rigidity connected bottom ring 47a and upper tapered ring 48a (corresponding to parts 47 and 48 of the upper assembly) are not free for either vertical or turning movement, but rather are rigidly secured to frame 20. For this purpose, the bottom horizontal ring 47a may typically be supported on and be rigidly welded or bolted to a horizontal plate 147a which is in turn secured rigidly to plates 28 carried by legs 26 of the frame. Coacting with slip bowl assembly 46a, there are provided a series of circularly spaced slips 50a actuable upwardly and downwardly relative to the slip bowl by circularly spaced vertical piston and cylinder mechanisms 60a through an actuating ring 56a, with the slip bowl carrying spaced vertical members 70a, all corresponding to and functioning in the same manner as the similarly numbered parts 50, 56, 60 and 70 respectively.

The stabbing bell 22 is essentially annular about axis 19, and frustoconical in shape to provide within its interior a downwardly tapering pile centering throat, with the diameter at the upper end of this throat being substantially greater than the external diameter of the piles to be handled, and with the diameter of lower end of the throat being just slightly greater than that pile diameter. Thus, a pile may be easily stabbed into the throat within the bell 22, and then centered by the bell as the pile is lowered therethrough.

Mast 23 may take the form of an open framework as shown, whose lower portion is received essentially about the upper end of main frame 20, with the various members forming the mast typically including two relatively long rear corner members 73, two shorter forward corner members 74, and various cross pieces and brace members 75 extending between and rigidly interconnecting members 73 and 74. A ladder 76 may be secured to a rear side of this mast structure, and a second and lower ladder 77 may be secured to the front side of the frame 20. At its lower end, near the lower extremities of the two members 73, the mast has two horizontally aligned tubular hinge or bearing portions 78, which are engageable with and received about two aligned hinge pins 79 secured to opposite sides of frame 20, to mount the mast for the previously mentioned swinging movement between the full line and broken line positions of FIG. 7. the mast is power actuable between these positions by two piston and cylinder mechanisms 80, the cylinders of which are pivotally secured at 81 to opposite sides of frame 20, and the pistons of which are pivotally connected to the mast at locations 82, which are at the lower ends of the two members 74 respectively.

Figure 9:
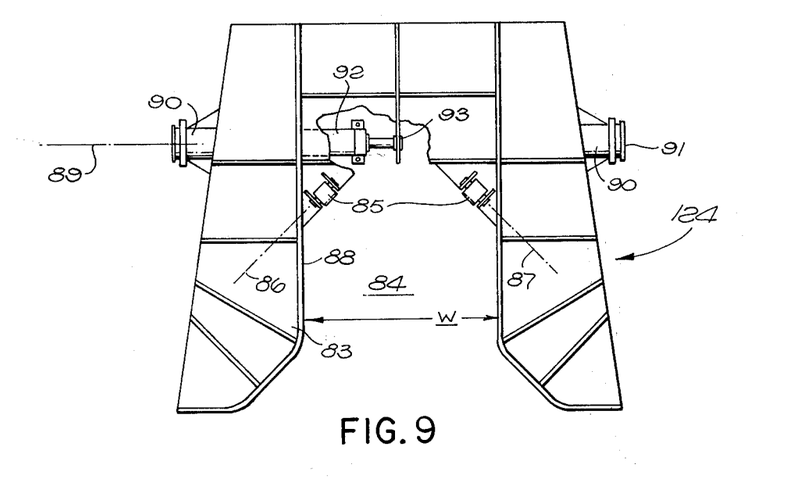
FIG. 9 is a plan view of the upper aligning apparatus taken on line 9—9 of FIG. 8.
Figure 10:
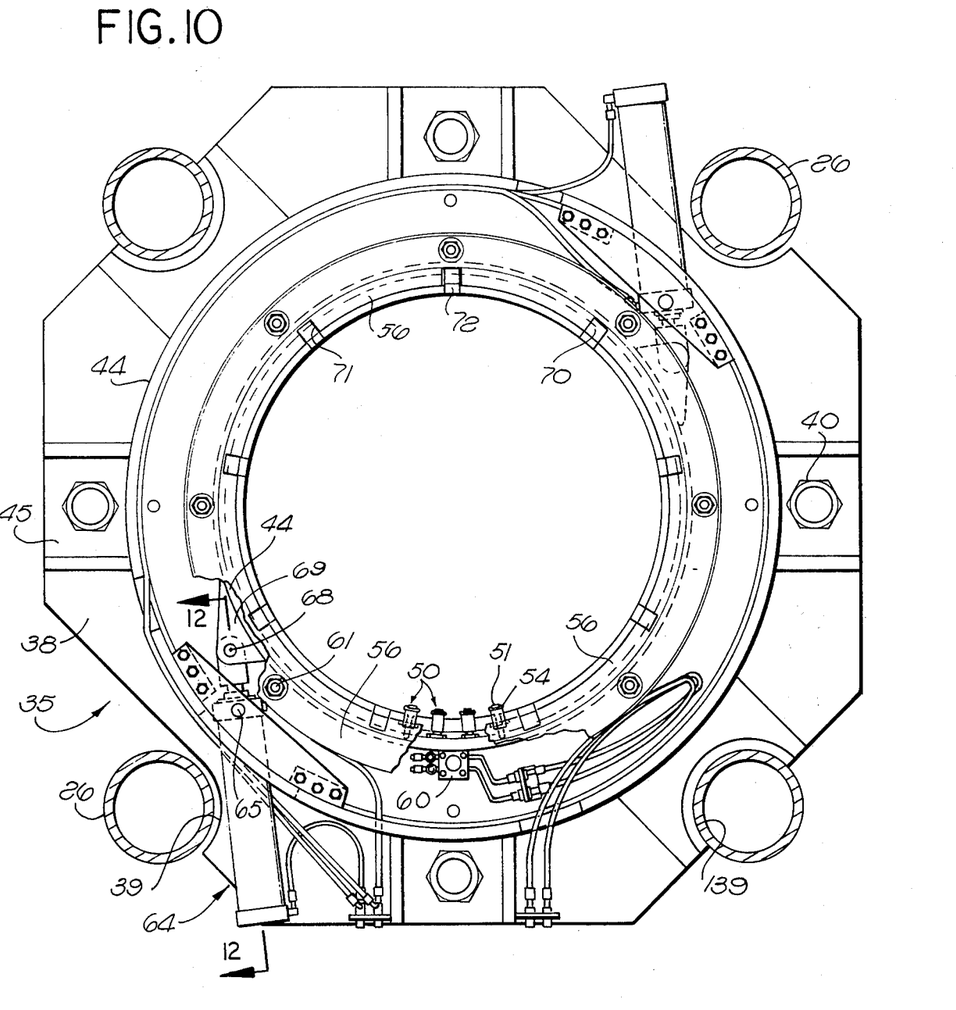
FIGS. 10 and 11 are horizontal sections taken on lines 10—10 and 11—11 respectively of FIG. 8.
Figure 10A:
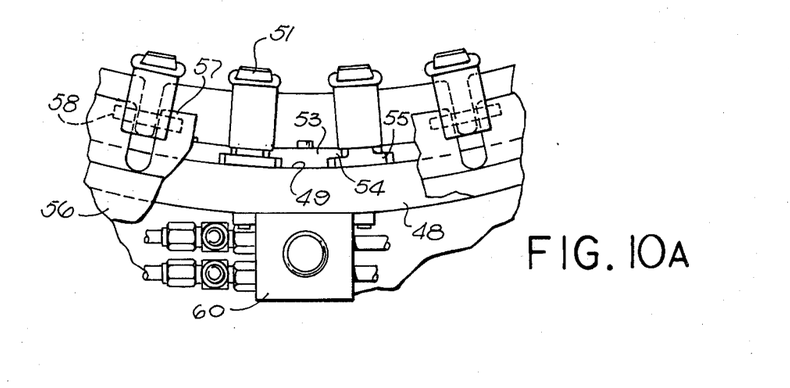
FIG. 10a is an enlarged detail view of a portion of FIG. 10.
Figure 11:
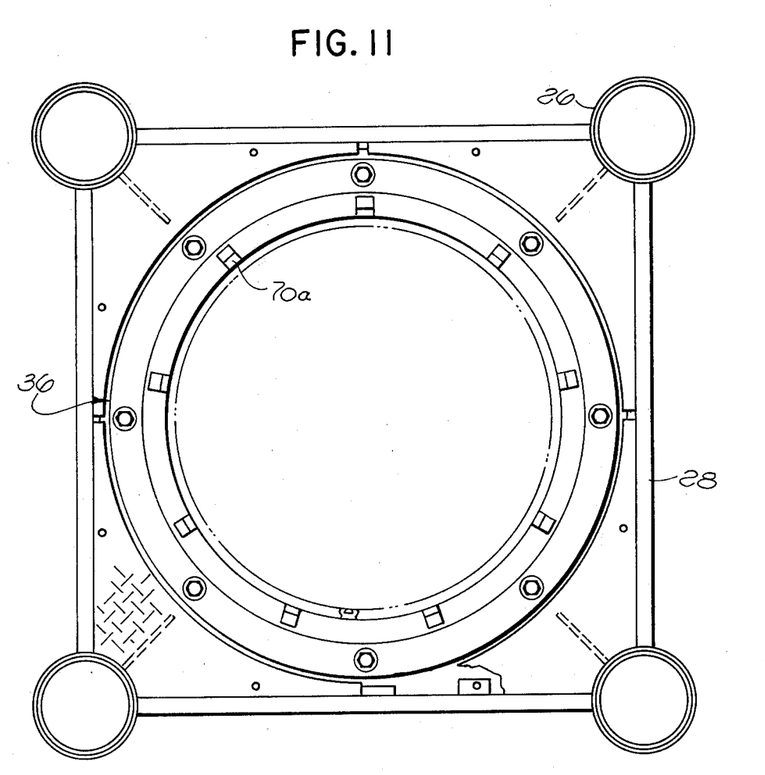
Figure 12:
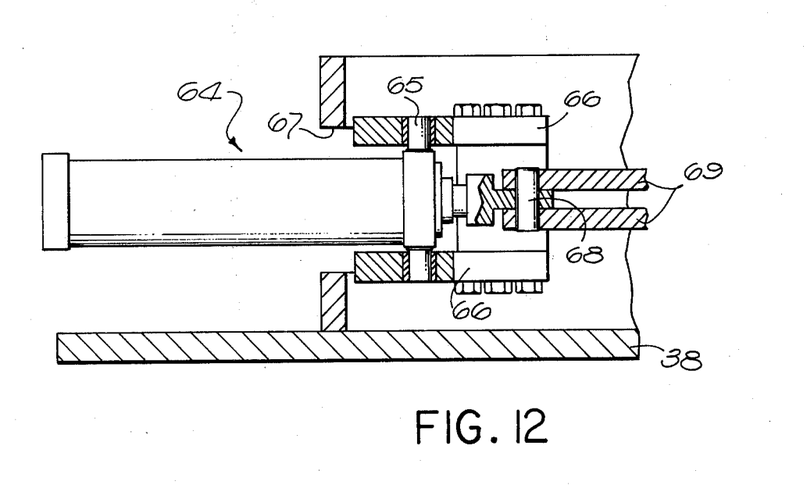
FIG. 12 is a fragmentary vertical section taken on line 12—12 of FIG. 10.
Figure 13:
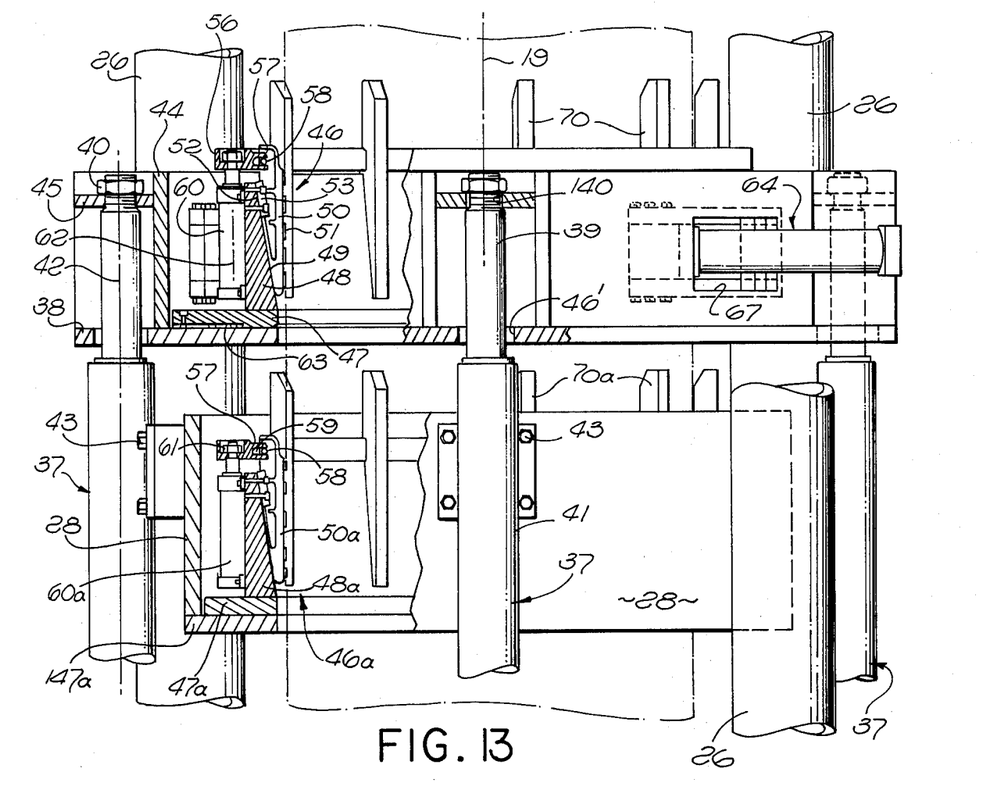
FIG. 13 is a fragmentary vertical section taken on line 13—13 of FIG. 8.

The aligning unit 124 at the upper end of mast 23 includes a rigid structure 83 which has the essentially U-shaped horizontal section illustrated in FIG. 9, and which may be fabricated from a number of rigid metal plates appropriately welded or otherwise secured together to form the desired structure and reinforce it to take the forces exerted thereagainst by a pile section in use. The U-shaped structure 83 contains and defines a recess 84 extending into the structure from one of its sides (the left side in FIG. 7), with this recess being of a width w just slightly more than the external diameter of the pile section, to receive the pile in confined and located relation. A pair of rollers 85 mounted to structure 83 for rotation about horizontal axes 86 and 87 are positioned to engage the pipe at circularly spaced locations and effectively locate it when the pipe is resting against the rollers. In the inclined FIG. 3 position of the apparatus, the inclination of the tool and pile are such that the weight of the pile is exerted directly laterally against rollers 85. The edges of the recess 84 within the pile is received in structure 83 may be defined by vertically extending walls 88 which are welded to and follow the inner edges of the other plates forming structure 83 and therefore present pile engaging areas of substantial size.

The U-shaped structure 83 is mounted for limited transverse shifting movement relative to mast 23, along the axis 89 of FIG. 9, and for this purpose may carry aligning bearing rings 90 depending from opposite sides of structure 83 and received about two externaly cylindrical hinge pins 91 rigidly secured to the upper end of the mast at its oposite sides. A horizontal piston and cylinder mechanism 92 has its cylinder secured to the mast and its piston connected to 93 to structure 83, to move that structure laterally along axis 89 and thereby very precisely locate this aligning structure relative to the jack mechanism and other portions of the apparatus.

To now describe the preferred method of use of the discussed pile aligning machine, assume first of all that the jacket 10 of FIG. 1 has been positioned at a desired off-shore location, with each pile guide 13 containing an initial pile section temporatily welded thereto, and with a number of additional pile sections being carried by the barge 94 of FIG. 1 to a location adjacent the jacket. As illustrated in FIG. 1, the tool 18 is lifted by crane 95 to a position above one of the pile guides 13, and is gradually lowered by the crane about the pile section 14 and guide 13 to a position of support on part 15 (as in FIG. 3). The mast of the tool is normally elevated during such movement of the tool onto the guide, and the tool is turned about the guide axis 16 until the mast is at the side of the tool which corresponds to the lateral direction in which axis 16 is inclined. In this position, the tool is so located with respect to the tilt of the guide that an inclined pile can be held by gravity against rollers 85.

After the tool has been positioned in this manner, the aligning mast 23 is power actuated by piston and cylinder mechanisms 80 from its upstanding position to its laterally retracted position of FIG. 2, so that the crane can lower a next successive pile section to the FIG. 2 position just above stabbing bell 22, without interference being offered by the mast. With the upper gripping unit 35 in its uppermost position, above the upper end of initial pile section 14, a second pile section 14' is gradually lowered into contact with the tapering throat within the stabbing bell, so that the bell can center the pile and direct it downwardly into alignment with and close proximity to the upper end of the first pile section. The mast is then swung upwardly to its FIG. 3 position in which it engages and accurately aligns the second pile section at an upper location, with that section being lowered until it is received within and is then gripped by upper gripping unit 35. The upper gripping unit and top aligning unit 124 will thus hold the top section in precise alignment with the lower section for completion of a rigid connection therebetween, as by welding, or by bringing together the connector elements of an interrupted thread type 'breech block' connection, or any other type mechanical joint. Controlled adjustment of the precise setting of the mast in a left to right direction as viewed in FIG. 3 assures exact alignment of the pile sections in one direction, while movement of top aligning structure 83 relative to the mast by piston and cylinder mechanism 92 accurately aligns the sections in a plane offset 90° from the plane of adjustment of the mast itself.

When the sections have been properly aligned, the upper gripping assembly 35 is operated to gradually lower the upper pile section 14' into contact with the upper end of the lower pile section 14, and the two section may then be welded rigidly together or otherwise interconnected. If an interrupted thread connection is provided, the piston and cylinder mechanisms 64 of the upper gripping unit may be hydraulically operated to turn the slips of that gripping unit about axis 19 in order to apply rotative torque to the upper pile section to complete the connection between the two sections.

After this connection has been completed, the temporary weld between section 14 and guide 13 is broken, and the two joined pile section are lowered together along axis 19 to a position such as that shown in FIG. 4 in which the upper end of the second pile section 14' is near the stabbing bell 22. In some instances this lowering can be effected by the jacking mechanism, but in FIG. 4 it is assumed that section 14' is lowered by the crane, with the suspension line from the crane carrying an elevator 195 releasably clamped to the upper end of the pile, and with mast 23 retracted laterally as shown in FIG. 4 to avoid interference with the elevator.

Figure 5:
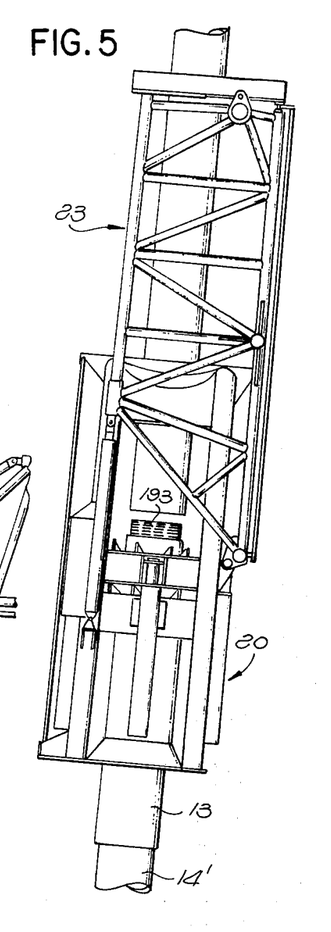

After the second pile section 14' has reached the position of FIG. 4, the upper gripping unit 35 in its uppermost position is actuated into gripping engagement with section 14', and the pick-up elevator 195 is released or returned to the barge to get a next successive pile section. The gripping unit 35 is moved downwardly relative to the bottom gripping unit 36, to correspondingly move the interconnected pile sections downwardly, following which lower gripping unit 36 is clamped against the section 14' and the upper unit 35 is released to return upwardly for a next successive lowering operation. This jacking action is continued until the upper end of section 14' reaches the position of FIG. 5 just above lower gripping unit 36, in which position a third pile 14" can be connected to section 14'. The third section 14" is of course located and aligned by the same procedure discussed in connection with section 14', being first stabbed into the upper locating bell 23 with the mast retracted, and then aligned by the mast and lowered to the FIG. 5 position, in which the upper gripping unit 35 can grip section 14" and move it downwardly for connection to section 14'. In FIG. 5, it is assumed that this connection is a 'breech block' type joint in which section 14' has an upper connector portion 193 with external interrupted threads adapted to engage corresponding internal interrupted threads within section 14". The connection is thus completed by actuating upper gripping assembly 35 to first lower section 14" into engagement with section 14' and then turn section 14" relative to section 14' to bring their threads into rigidly interconnected relation. After the joint has been completed, the connected sections are lowered until the third section 14" is positioned for connection to a next successive pile section, and the cycle is repeated until enough sections have been connected together to reach the ocean floor.

As has been mentioned, the first add-on pile section is in most cases lowered to the FIG. 4 position by the pick-up elevator 195 suspended from the crane. This is because of the provision of external grouting ribs on the first add-on pile section which should not be gripped by units 35 and 36. All subsequent pile sections, however, such as section 14", are preferably lowered by the jacking mechanism itself, after completion of the connection at the lower end of each section to the preceding section. That is, after the section 14" in FIG. 5 has been connected to section 14", the three interconnected sections are then lowered by the jacking mechanism, by first gripping section 14" in upper gripping unit 35 in its uppermost position, then moving that upper unit and the pile downwardly relative to the lower released gripping unit 36, following which the lower unit is gripped against the pile and the upper unit 35 is released and returned upwardly, to again grip the pile and lower it through another step, etc.

Figure 6:
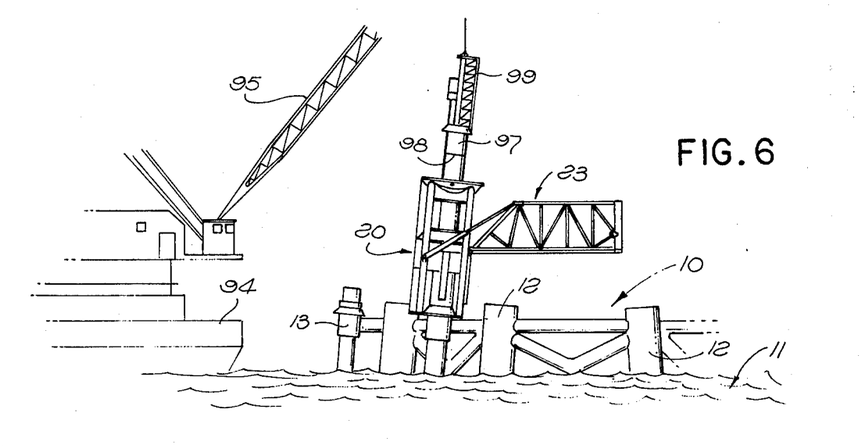

When the pile reaches a length at which it becomes necessary to commence driving the pile into the ocean floor, a drive section 97 is connected to the uppermost pile section, being joined thereto at 98 (FIG. 6), and a conventional pile hammer 99 is placed about this drive section and energized to exert downward driving force thereagainst to force the pile into the ocean floor. During this driving operation, the mast is retracted laterally as shown in FIG. 6, to be out of the way of the pile driver 99. When the hammer leads reach the level of stabbing bell 22, drive section 97 is detached from the uppermost pile section, as by breaking a threaded connection therewith, and another pile section can then be connected to the upper end of the string, with drive section 97 at the upper end thereof, to enable further driving of the string downwardly into the earth formation beneath the body of water.

After the required number of pile sections have been installed and driven into place, the tool 18 is again connected to the line from the crane and lifted thereby off of the guide through which the pile sections have been installed, and the tool may then be moved to a position of support by a second of the pile guides 13 for used in lowering a series of pile sections downwardly therethrough in the same manner discussed in connection with the first guide. In this way, piles can be progressively applied to all of the guides, and the entire jacket can be secured in position relative to the ocean floor, with a working platform ultimately being mounted on the secured jacket.

While a certain specific embodiment of the present invention has been disclosed as typical, the invention is of course not limited to this particular form, but rather is applicable broadly to all such variations as fall within the scope of the appended claims.

I claim:

1. A pile handling tool comprising:
   a portable support structure adapted to be moved to a location at which a pile is to be lowered or raised;
   power actuated jacking mechanism carried by said support structure and constructed to jack a pile section longitudinally relative to the support structure;
   a mast structure carried by said support structure and projecting upwardly beyond said jacking mechanism; and
   pile aligning means carried by said mast structure and adapted to engage the pile section in aligning relation at a location above the jacking mechanism.

2. A pile handling tool as recited in claim 1, in which said support structure has a portion engageable with a pile guide in a relation removably supporting on the guide the weight of the support structure, jacking mechanism, mast structure and pile aligning means at locations to advance a pile section through the guide.

3. A pile handling tool as recited in claim 1, in which said jacking mechanism includes two gripping units adapted to releasably grip a pile section or sections at two different locations respectively, and powered means for moving one of said gripping units axially relative to the other.

4. A pile handling tool as recited in claim 1, in which said support structure has a portion engageable with a pile guide in a relation removably supporting on the guide the weight of the support structure, jacking mechanism, mast structure and pile aligning means at locations to advance a pile section through the guide, said jacking mechanism including two gripping units adapted to releasably grip a pile section or sections at two different locations respectively, and powered means for moving one of said gripping units axially relative to the other.

5. A pile handling tool as recited in claim 1, in which said jacking mechanism includes two gripping units adapted to releasably grip a pile section or sections at two different locations respectively, and powered means for moving one of said gripping units axially relative to the other, each of said units including a first section having a plurality of tapered pile gripping slips, a second section forming a tapered slip blow engageable with said slips to releasably cam them inwardly against a pile section, and powered means for actuating said first section and said second section axially relative to one another to actuate and release the slips.

6. A pile handling tool as recited in claim 1, including means mounting said mast structure to said support structure for movement relative thereto between an active pile aligning position and a retracted position away from the pile section.

7. A pile handling tool as recited in claim 1, including powered means operable to power actuate said mast structure relative to said support structure between an active pile section aligning position and a retracted position.

8. A pile handling tool as recited in claim 1, including means connecting said mast structure near a lower end thereof to said support structure for relative swinging movement from an upwardly projecting active pile section aligning position to a laterally projecting retracted position.

9. A pile handling tool as recited in claim 1, including means connecting said mast structure near a lower end thereof to said support structure for relative swinging movement from an upwardly projecting active pile section aligning position to a laterally projecting retracted position, and power actuated means for swinging said mast structure between said two positions thereof.

10. A pile handling tool as recited in claim 1, in which said support structure has a portion engageable with a pile guide in a relation removably supporting on the guide the weight of the support structure, jacking mechanism, mast structure and pile aligning means at locations to advance a pile section through the guide, there being means connecting said mast structure near a lower end thereof to said support structure for relative swinging movement from an upwardly projecting active pile section aligning position to a laterally projecting retracted position.

11. A pile handling tool as recited in claim 1, including a stabbing unit by said support structure above said jacking mechanism and forming a downwardly tapering throat for guiding the lower end of a pile section into generally centered relation with respect to said jacking mechanism as the pile section is lowered into and through the stabbing unit.

12. A pile handling tool as recited in claim 1, in which said aligning means include rollers engageable with a side of a pile section at circularly spaced locations to hold the pile section in alignment with said jacking mechanism.

13. A pile handling tool as recited in claim 1, in which said aligning means include a generally U-shaped structure defining a recess which receives and locates said pile section and which is open at one said for relative lateral movement of the pile section into and out of said recess.

14. A pile handling tool as recited in claim 1, in which said aligning means are shiftable generally transversely of a pile section relative to said mast structure.

15. A pile handling tool as recited in claim 1, in which said aligning means are shiftable generally transversely of a pile section relative to said mast structure, there being power actuated means for moving said aligning means transversely of the pile section relative to said mast structure.

16. A pile handling tool as recited in claim 1, in which said aligning means include a generally U-shaped structure defining a recess which receives and locates said pile section and which is open at one side for relative lateral movement of the pile section into and out of said recess, there being rollers carried by said U-shaped structure and engageable against a pile section in laterally supporting relation at circularly spaced locations, and power operated means for shifting said U-shaped structure relative to said mast structure in a direction generally transversely of an engaged pile section.

17. A pile handling tool as recited in claim 1, in which said jacking mechanism includes two gripping units for releasably gripping a pile section or sections at spaced locations, means for actuating one of said unit axially relative to the other, and means for turning one of said gripping units about the pile axis relative to the other to relatively rotate two pile sections for making a connection therebetween.

18. A pile handling tool as recited in claim 1, in which said support structure has a portion engageable with a pile guide in a relation removably supporting on the guide the weight of the support structure, jacking mechanism, mast structure and pile aligning means at locations to advance a pile section through the guide, said jacking mechanism including two gripping units adapted to releasably grip a pile section or sections at two different locations respectively, and powered means for moving one of said gripping units axially relative to the other, and for turning one of said gripping units relative to the other, there being means mounting said mast structure to said support structure for movement relative thereto between an active pile aligning position and a laterally retracted position, and a stabbing unit carried by said support structure above said jacking mechanism and forming a downwardly tapering throat for guiding the lower end of a pile section into generally centered relation with respect to said jacking mechanism.

19. A pile handling tool as recited in claim 18, in which said aligning means are shiftable generally transversely of a pile section relative to said mast structure, there being power actuated means for moving said aligning means transversely of the pile section relative to said mast structure.

20. A pile handling tool as recited in claim 1, in which said support structure has a downwardly facing shoulder near a lower end therof engageable downwardly against a pile guide to support said tool thereon; said jacking mechanism including two vertically spaced gripping units each including a series of circularly spaced tapered slips, a slip bowl section and powered means for moving said slips axially relative to said slip bowl section to releasably clamp the slips against a pile section; said jacking mechanism including power operated means for shifting one of said gripping units axially relative to the other, and additional power operated means for turning one of said gripping units relative to the other about the pile axis; there being a stabbing bell carried by said support structure at a location above said jacking mechanism and containing an inner downwardly tapering throat for centering a pile section as it moves downwardly into and through said stabbing bell; hinge means connecting a lower portion of the mast structure to said support structure to mount the mast structure for laterally outward and downward swinging movement from an upwardly projecting active pile section aligning position to a laterally projecting retracted position; piston and cylinder means connected at opposite ends to said mast structure and said support structure for power actuating said mast structure between said active and retracted positions; said aligning means includng a generaly U-shaped aligning structure containing a recess open at one side for laterally receiving a pile section and mounted for movement generally transversely of said recess and a contained pile section relative to said mast structure and having pile section engaging rollers, and further power operated means for shifting said U-shaped structure relative to said mast structure.

* * * * *